United States Patent
Tedijanto et al.

(10) Patent No.: US 7,414,985 B1
(45) Date of Patent: Aug. 19, 2008

(54) LINK AGGREGATION

(75) Inventors: Theodore E. Tedijanto, Cupertino, CA (US); Paul Curtis, Atlanta, GA (US); Neeraj Gulati, Cupertino, CA (US); Helen Zhang, Santa Clara, CA (US)

(73) Assignee: Ciena Corporation, Linthicum, MD (US)

( * ) Notice: Subject to any disclaimer, the term of this patent is extended or adjusted under 35 U.S.C. 154(b) by 752 days.

(21) Appl. No.: 10/061,995

(22) Filed: Feb. 1, 2002

(51) Int. Cl.
 *H04L 12/28* (2006.01)

(52) U.S. Cl. .................. 370/255; 370/236; 370/400

(58) Field of Classification Search ............... 370/255, 370/400, 401, 410, 391, 254, 230, 230.1, 370/231, 232, 233, 235, 236, 236.1, 236.2, 370/352, 353, 354, 355, 356, 390, 392, 395.21, 370/396, 408, 409
See application file for complete search history.

(56) References Cited

U.S. PATENT DOCUMENTS

| | | | | |
|---|---|---|---|---|
| 5,422,883 A * | 6/1995 | Hauris et al. | ................ | 370/261 |
| 5,535,195 A * | 7/1996 | Lee | ............................. | 370/256 |
| 5,541,917 A * | 7/1996 | Farris | ......................... | 370/352 |
| 5,687,168 A * | 11/1997 | Iwata | .......................... | 370/255 |
| 5,764,740 A * | 6/1998 | Holender | ............... | 379/112.05 |
| 5,790,546 A * | 8/1998 | Dobbins et al. | ............ | 370/400 |
| 6,657,961 B1 * | 12/2003 | Lauffenburger et al. | ..... | 370/231 |
| 6,674,718 B1 * | 1/2004 | Heddes et al. | .............. | 370/230 |
| 6,807,178 B1 * | 10/2004 | Lemieux | .................. | 370/395.2 |
| 6,810,426 B2 * | 10/2004 | Mysore et al. | ............. | 709/234 |
| 6,973,072 B1 * | 12/2005 | Muntz | ......................... | 370/351 |
| 7,023,797 B2 * | 4/2006 | Tagore-Brage | .............. | 370/230 |
| 7,130,262 B1 * | 10/2006 | Cortez et al. | ................ | 370/216 |
| 7,242,679 B1 * | 7/2007 | Cortez et al. | ................ | 370/351 |
| 2002/0019866 A1 * | 2/2002 | Linzy | ........................ | 709/223 |
| 2002/0073226 A1 * | 6/2002 | Sridhar et al. | ............... | 709/235 |
| 2002/0097680 A1 * | 7/2002 | Liu et al. | .................... | 370/238 |
| 2002/0103924 A1 * | 8/2002 | Nomura | ...................... | 709/235 |
| 2002/0105963 A1 * | 8/2002 | Boroditsky et al. | ......... | 370/458 |
| 2002/0131365 A1 * | 9/2002 | Barker et al. | ................ | 370/235 |
| 2003/0061533 A1 * | 3/2003 | Perloff et al. | ................. | 714/9 |
| 2003/0147400 A1 * | 8/2003 | Devi | ..................... | 370/395.21 |
| 2005/0163123 A1 * | 7/2005 | Gangadharan | .............. | 370/392 |
| 2006/0127089 A1 * | 6/2006 | Smith | .......................... | 398/57 |
| 2006/0156402 A1 * | 7/2006 | Stone et al. | ................... | 726/22 |

* cited by examiner

*Primary Examiner*—Chi H. Pham
*Assistant Examiner*—Kevin Mew
(74) *Attorney, Agent, or Firm*—Clements Bernard Miller; Christopher L. Bernard; Tyler S. Brown (57) ABSTRACT

A method and system for aggregating a plurality of parallel communications links transmitting data between adjacent nodes in a network is provided. The method simplifies network topology by replacing multiple parallel communications links between nodes in the network with a single aggregated link. The method advertises the available bandwidth of each aggregated link to the network, the available bandwidth being the maximum bandwidth available for any one of the parallel links in the aggregate. The method permits each aggregated link to select which of the parallel links in the aggregate is to be used to transfer data from one node to the other. Aggregating links can be automatic and based on one or more predetermined criteria, such as the service class supported by the parallel links.

28 Claims, 9 Drawing Sheets

| LINK | CLASS | TOTAL BW | AVAIL. BW |
|---|---|---|---|
| 140a | SC-1 | 48 | 38 |
| 140b | SC-2 | 48 | 3 |
| 140c | SC-3 | 48 | 3 |
| 140d | SC-2 | 48 | 48 |
| 140e | SC-3 | 48 | 30 |
| 140f | SC-3 | 48 | 38 |

| LINK | AVAIL. BW |
|------|-----------|
| 140a | 0 |
| 140b | 3 |
| 140c | 48 |
| 140d | 10 |
| 140e | 45 |

| LINK | CLASS | TOTAL BW | AVAIL. BW |
|------|-------|----------|-----------|
| 140a | SC-1 | 48 | 38 |
| 140b | SC-2 | 48 | 3 |
| 140c | SC-3 | 48 | 3 |
| 140d | SC-2 | 48 | 48 |
| 140e | SC-3 | 48 | 30 |
| 140f | SC-3 | 48 | 38 |

Fig. 7B

LINK AGGREGATION

RELATED APPLICATIONS

The present application is related to currently pending U.S. patent application Ser. No. 09/259,263, filed Mar. 1, 1999, entitled "Routing and Signaling in a Sonnet Network", which is herein incorporated by reference in its entirety, and U.S. patent application Ser. No. 09/493,344, filed Jan. 28, 2000, entitled "System and Method for Calculating Protection Routes in a Network Prior to Failure", which is herein incorporated by reference in its entirety.

FIELD OF THE INVENTION

The present invention relates generally to communication systems, and more particularly to a communication system capable of aggregating optical links.

BACKGROUND OF THE INVENTION

In the large-scale networks of today, information flows through a series of nodes in the network from one location or site to another. As the network grows, more and more transmission lines are added to handle the heavy traffic flow between the nodes. To handle the information flow across the transmission lines, network switches are often used at the network nodes to direct the information between the various locations. By properly configuring the switches, information can be switched or directed from any ingress port to any egress port of the switch. An example of such a network switch is the MultiWave CoreDirector™ switch, manufactured and distributed by CIENA Corporation of Linthicum, Md.

Figure 1:
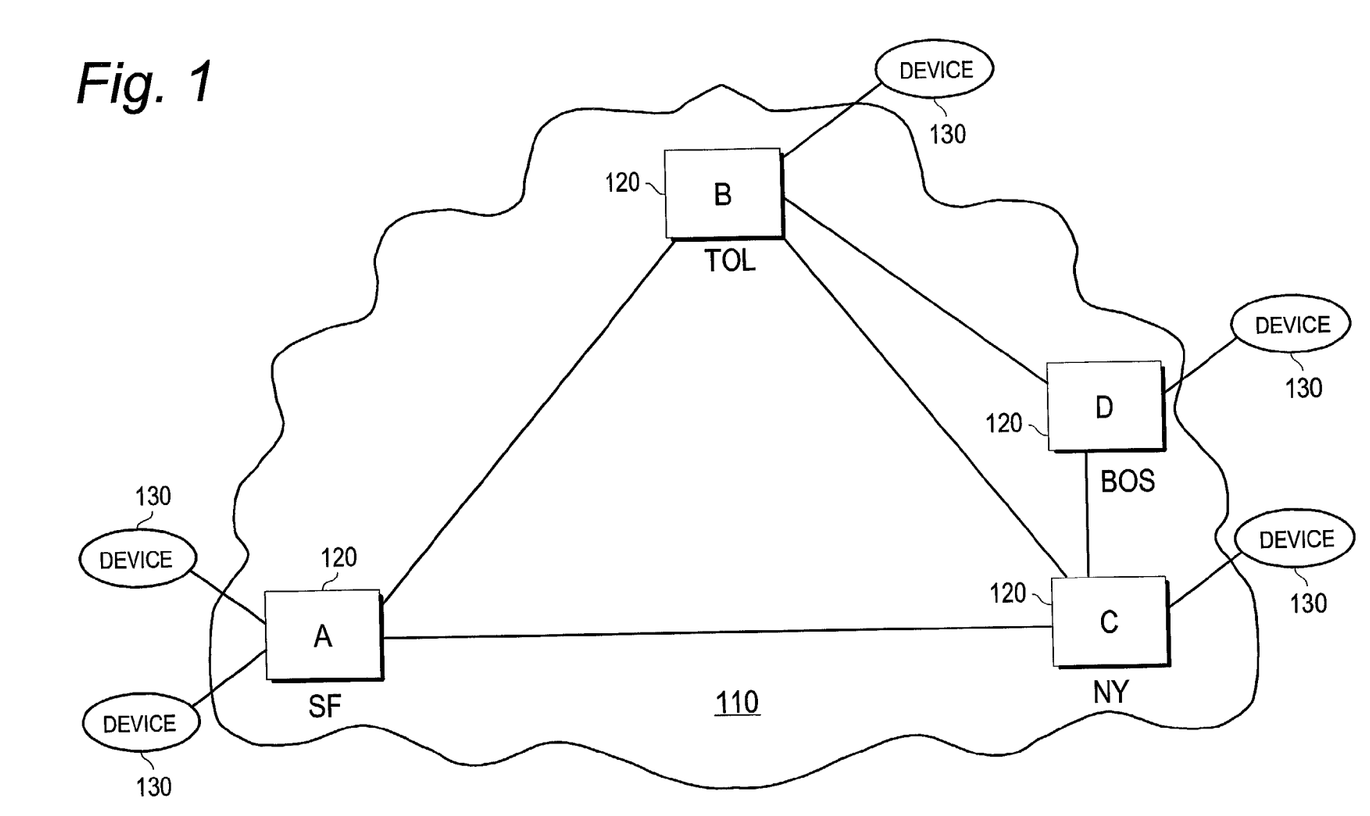
FIG. 1 is a schematic representing an exemplary network.

FIG. 1 shows how information in a network 110 flows between many nodes 120. In an exemplary network, the nodes 120 are network switches. As FIG. 1 shows, each node 120 is located at various sites throughout network 110. For example, node 120 in San Francisco is connected to nodes 120 in Toledo and New York; the Toledo node 120 is connected to nodes 120 in New York and Boston; the New York node is connected to node 120 in Boston. Each node 120 is connected to one or more local devices 130 that communicate with other nodes and devices on the network. In addition, a client module 102 can be connected to the network 110 in order to provide a user with a mechanism to view limited characteristics of aspects of the network 110.

Using a routing and signaling protocol switches can be integrated in the same network. These protocols can create a network topology that represents a real-time view of the status and availability of the connections between nodes 120. The signaling and routing protocol can create a route, a basic "roadmap" for sending signals from an originating node to a destination node. The protocol generates the route based on many factors, such as network traffic, node status, down lines, etc. For example, the route may send a signal from San Francisco to Boston by directing it through Toledo. If for some reason that path is not available or desirable, the route could alternatively direct the signal through New York to Boston.

The signaling and routing protocol is also responsible for re-routing signals in the event of a failure of any line in the path. When a line in the route fails, the protocol updates the network topology and generates a new route that re-directs the signal using other available lines. Thus, in the above example, if the line between Toledo and Boston were to fail, the new route could re-direct the signal from San Francisco to Toledo to New York to Boston, or alternately go directly from San Francisco to New York to Boston. Again, the protocol would select the most desirable path available.

In practice, each connection between nodes does not consist of a single line as shown in FIG. 1, but rather is a plurality of parallel links. Additionally, each parallel link in the connection could have the capacity to carry a number of signals. For example, assume the network 110 of FIG. 1 is a Synchronous Optical Network (SONET) or Synchronous Digital Hierarchy (SDH) network and the connection between node A and node B comprises 40 parallel links, each carrying 48 optical carrier levels (OC-48) or timeslots. In that case, network 110 of FIG. 1 would contain a total of 200 parallel links and 9,600 timeslots. For simplicity purposes, all references to SONET shall be considered interchangeable with SDH. The signaling and routing protocol would have to manage all these timeslots between all nodes 120 on network 110.

In order to keep the network topology current, each node 120 in network 110 advertises the status and availability of the parallel links that connect that node to adjacent nodes in the network. This way, the signaling and routing protocol can optimize and select the best transmission path available between any two nodes. Any time the status or availability of any of the parallel links changes, node 120 advertises the new information to network 110. Using the example as described above, node A of FIG. 1 can advertise throughout network 110 the status and availability of each of the forty parallel links connecting node A to node B. Any time the status of any of the parallel links changes, node A advertises this new information to all nodes 120 on network 110. Thus, if one of the parallel links were to fail, node A advertises the unavailability of the failed link to the network. The signaling and routing protocol would then change the network topology accordingly.

In large networks, the maintenance of network topology information can be difficult and cumbersome and can severely curtail the performance and maintenance of a network. As network administrators deal with much larger and complex networks, many problems can arise as the number of nodes, parallel links and capacity per link increase.

First, because the signaling and routing protocol builds a topology database at each node 120 in network 110, larger networks with many nodes and links between nodes can use up a significant amount of memory at each node 120. Additionally, whenever any node 120 in the network initializes, a parallel link 140 is removed, fails or any other event occurs that results in a change in the network topology, the affected node 120 must advertise to each and every other node 120 on network 110 the new topology information. Obviously, a network with hundreds or thousands of parallel links 140 could easily and frequently be flooded with new topology information generated from the change in status of the many connections between its many nodes, requiring very significant processing and communications bandwidth. Maintaining topology information over such a network thus places a tremendous burden on network performance and scalability. Also, many element management or network management systems using graphics to represent network topology cannot feasibly represent a network with many hundreds or even thousands of links.

As networks quickly become larger and more complex, a need exists to simplify the topology of complex networks in order to avoid the considerable amount of advertising that causes increased information traffic flow over the network. Decreasing the amount of advertising across a network is desirable in order to increase network performance, maintenance, scalability and ease of use. An approach is needed that permits such real-time, dynamic and seamless changes in the network topology and configuration without adversely affecting network performance. Additionally, a need exists to quickly and easily calculate and recalculate routes between nodes, notwithstanding a dynamic change in the number of parallel links added to or dropped from the network.

SUMMARY OF THE INVENTION

Techniques are provided for aggregating multiple parallel communications links between adjacent nodes in a network. The techniques simplify a network topology by replacing multiple parallel links between nodes with a single aggregated link. The aggregated link is represented as a single link in the network topology. Therefore, instead of advertising the status of each individual parallel link, the status of the aggregated link is advertised to the network based on the optimized value of all parallel links in the aggregate.

To aggregate parallel links, a first node interacts with a second node across the parallel links connecting the two nodes. Once both nodes establish a common aggregation scheme, both nodes then may aggregate the common parallel links into a single aggregated link. Moreover, the first node can transmit data to the second node using the parallel link best optimized to transmit the data based on its status information, thereby increasing uptime and performance. Parallel links can be automatically selected for aggregation based on predetermined criteria, such as class of service.

The techniques of the present invention reduce the size of the topology database that is created at each node in the network as well as the amount of topology information that must be exchanged between nodes. Because an aggregated link is represented as a single link, the network topology does not need to change whenever a parallel link fails or is added to the network. This technique reduces the need and frequency at which new topology information floods the network. Additionally, a large number of nodes can be added to a network without surpassing the performance limits of the network. Network administrators can easily monitor and observe the status of network links and routes can be quickly generated because network operations are greatly simplified when fewer links are represented in the network topology.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Embodiments of a method and system for link aggregation in networks are described. In the following description, for the purposes of explanation, numerous specific details are set forth in order to provide a thorough understanding of the embodiments of the present invention. It will be apparent, however, that embodiments of the present invention may be practiced without these specific details. In other instances, well-known structures and devices are shown in block diagram form in order to avoid unnecessarily obscuring the embodiments of the present invention.

Operational Overview

Figure 2:
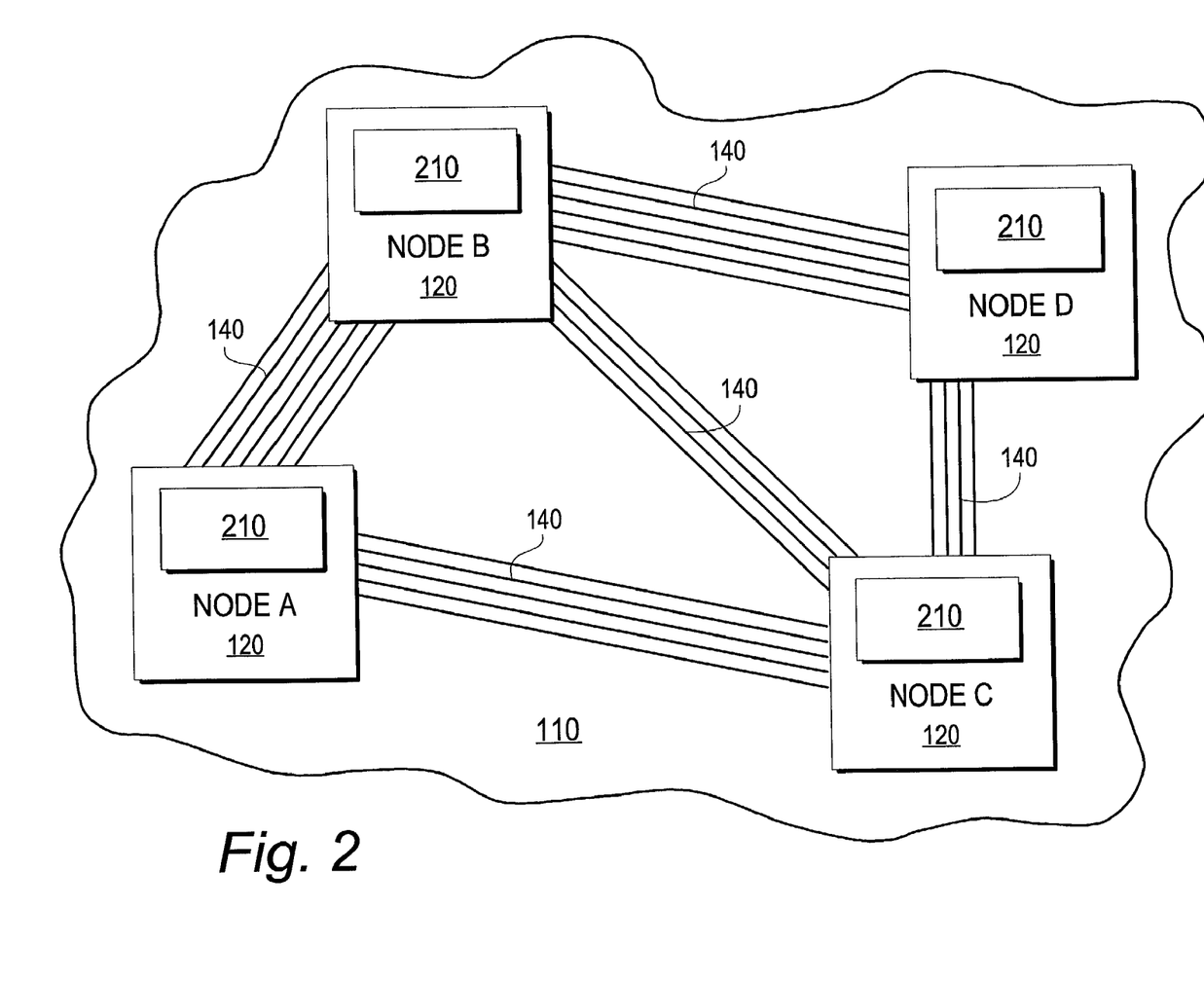
FIG. 2 depicts the physical topology of the exemplary network of FIG. 1, showing multiple parallel links.

As discussed above, FIG. 1 is a schematic representing an exemplary network 110 configuration. The network 110 includes multiple nodes 120. FIG. 2 depicts the physical topology of the exemplary network 110 of FIG. 1, where nodes A, B, C and D are connected together by multiple parallel links 140.

In one embodiment of the invention, each node in a network configuration similar to network 110 implements a signaling and routing protocol 210 that controls the network traffic on each node. Examples of signaling and routing protocol 210 are the ATM Forum's Private Network-Network Interface (PNNI) protocol and the Optical Signaling and Routing Protocol (OSRP™), which is developed and distributed by CIENA Corporation and described in more detail in U.S. patent application Ser. No. 09/259,263, filed Mar. 1, 1999, entitled "Routing and Signaling in a Sonnet Network", which is herein incorporated by reference in its entirety. In this embodiment, a node is a subnetwork connection (SNC) network element, such as a Multiwave CoreDirector™ switch, manufactured and distributed by CIENA Corporation, which utilizes a signaling and routing protocol, such as OSRP, to direct data traffic such as time division multiplexed traffic or wavelength traffic, over a defined route (SNC).

The signaling and routing protocol 210 includes two components, a routing protocol and a signaling protocol. The routing protocol handles the routing of data between nodes 120 on network 110. Each node 120 uses the routing protocol to advertise to network 110 the available bandwidth of each parallel link 140 connected to node 120. For example, in a SONET network, node 120 can advertise that a parallel link 140 in San Francisco has 3 available timeslots, or that a parallel link 140 in New York has 20 timeslots available, etc. The routing protocol then calculates a path for transmitting a signal between an originating node and a destination node based on the available resources at each node 120 in network 110. This feature, known as "rapid provisioning", is done automatically by the signaling and routing protocol 210 without the need for user intervention.

The signaling protocol causes the signal to be transmitted from the originating node to the destination node along the route (SNC) chosen by the routing protocol. The signaling protocol starts by sending a setup message through the nodes along the chosen route. The setup message lists the node (and the ports at each node) that is to be used to get the signal from its origin to its destination. Once the destination node receives the setup message, a cross-connect signal is sent from the destination node back to the origination node via the same routing path. Once the originating node receives the cross-connect signal, a connection is established for data exchange between the nodes.

Figure 3A:
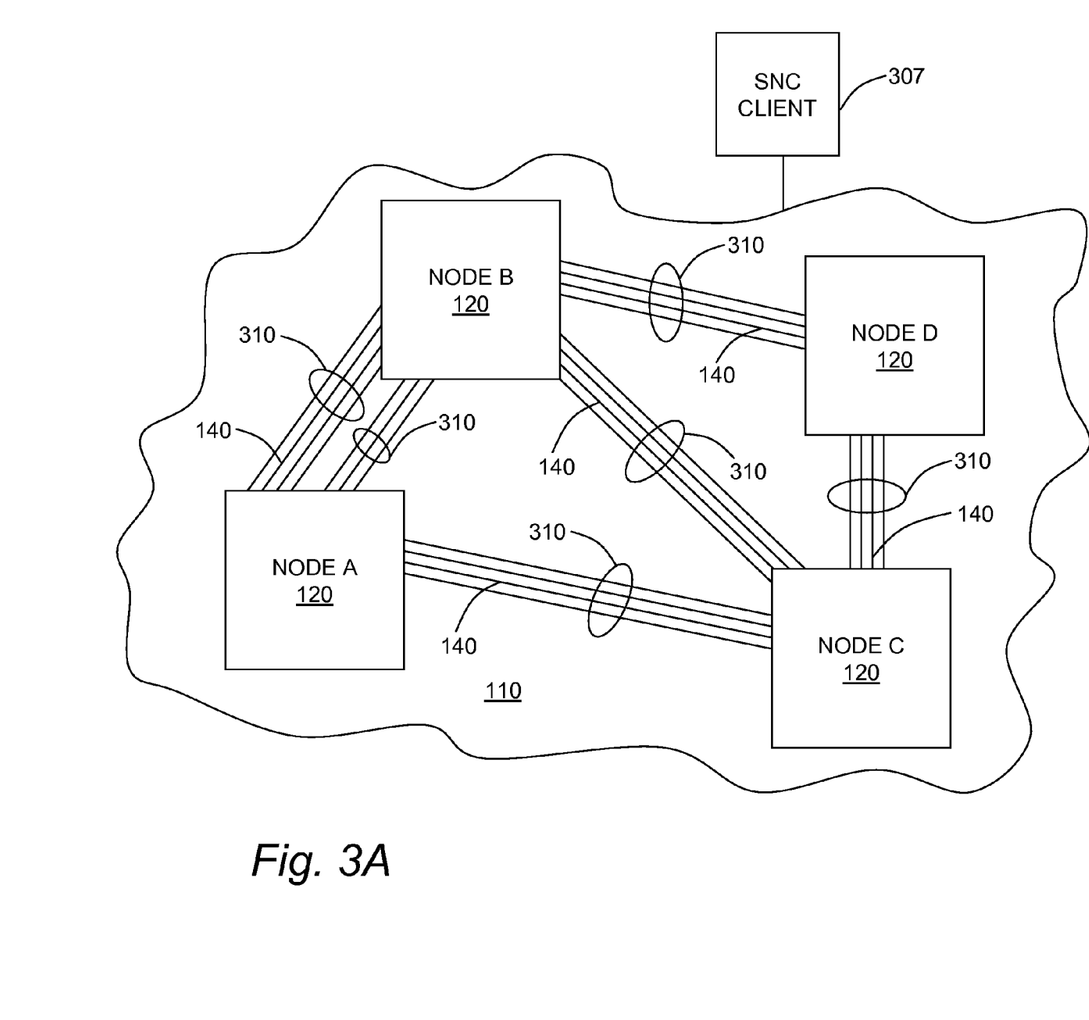
FIGS. 3A and 3B illustrate link aggregation as applied to the network of FIG. 1 in an embodiment of the present invention.
Figure 3B:
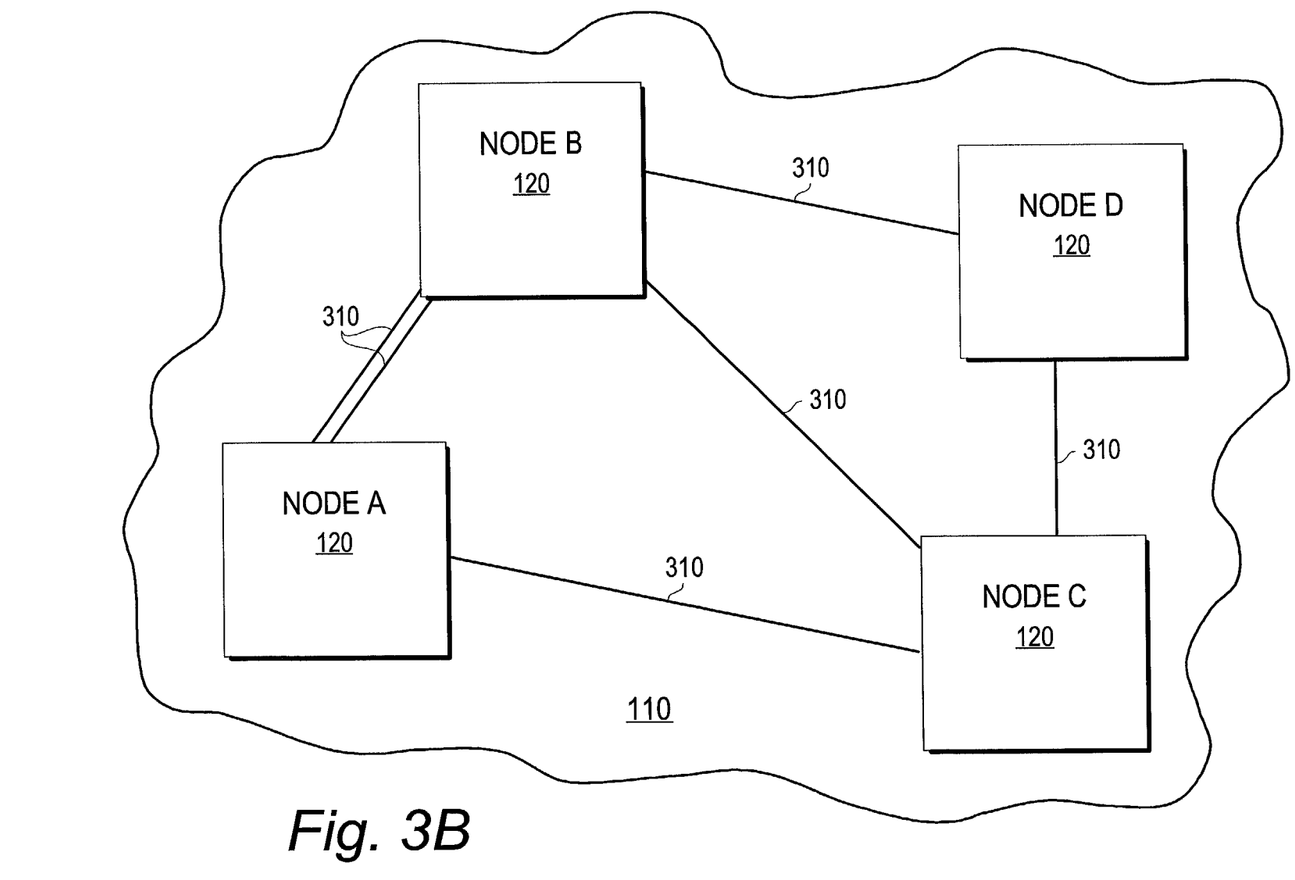

FIGS. 3A and 3B illustrate the application of a concept known as "link aggregation" to the network of FIG. 2 according to one embodiment of the present invention. In this embodiment, link aggregation is a software component of the signaling and routing protocol 210. Using link aggregation, multiple parallel links 140 between neighboring nodes on the network 110 are aggregated into a single aggregated link 310. Link aggregation can work on any type of parallel link 140, such as OC-48 links.

In FIG. 3A, multiple parallel links 140 connect node 120 at site A to node 120 at site B. Likewise, multiple parallel links 140 connect nodes 120 from sites A to C, B to C, B to D and C to D. In a standard network topology view, single lines would represent each of the multiple parallel links 140 of FIG. 3A. In one embodiment of the invention, the parallel links 140 between nodes A to C, B to C, B to D and C to D can be aggregated, as shown by aggregated links 310. Alternatively, it is not necessary to aggregate all parallel links 140 between nodes 120; any number of parallel links between each node can be aggregated. Thus, as shown in FIG. 3A, the parallel links 140 between nodes A and B are aggregated into two separate aggregated links 310.

After link aggregation, the resultant network topology, from the perspective of the signaling and routing protocol 210, is shown in FIG. 3B. After aggregation, each aggregated link 310 is represented as a single link on the network topology. Thus, as can be seen, the 24 parallel links 140 of FIG. 3A are now represented in the network topology by 6 aggregated links 310, a reduction in links of 4:1.

In another embodiment, the effects of link aggregation can be more profound, as shown in the following example. Assume that each node 120 in network 110 of FIG. 3A is connected by forty parallel links 140. Since there are a total of five connections between all nodes 120 (A-B, A-C, B-C, B-D and C-D), there would be a total of 200 parallel links 140 across network 110. Using link aggregation, the forty parallel links 140 of each connection can be aggregated into a single aggregated link 310. As a result, the 200 parallel links 140 on the entire network may now be represented in the new network topology by only five aggregated links 310. Instead of managing 200 links, network 110 only needs to manage the 5 aggregated links 310. Thus, the amount of status information (e.g., availability, bandwidth, service class, transmission delay and other criteria and combinations therefore) that must be advertised over network 110 is reduced by 40:1.

Utilizing link aggregation, the signaling and routing protocol 210 can also reduce the amount of topology information flooding the network when parallel links 140 fail. As discussed above, each of the parallel links 140 have the capacity to carry a number of signals, or bandwidth. In a non-aggregated network topology, the originating node advertises to the network 110 the amount of available bandwidth for each parallel link 140 connected to that node. Thus, for example, if one of the parallel links 140 should fail, that link carries no available bandwidth and the originating node must advertise this new topology information across the network 110. However, by aggregating a number of parallel links 140 into a single aggregated link 310, the originating node can advertise that the aggregated link 310 is available to support a request for service as long as any one of the parallel links 140 in the aggregation has the required bandwidth available. The originating node supports the request merely by using an available parallel link 140 that is operational. This reduces the amount of advertising that occurs on the network, and in turn reduces the new topology information traffic flooding the network.

Occasionally, one of the parallel links 140 of aggregated link 310 may need to be moved from one aggregated link 310 to another. It is desirable to move the link while it is carrying data, but without affecting traffic. This may occur, for example, when upgrading a system from a software release without link aggregation to a release that supports link aggregation. Moving parallel links 140 from one aggregated link 310 to another is possible using link aggregation since the aggregated links do not change the physical topology of the parallel links 140. Thus, no physical links need to be disabled or disconnected. In one embodiment of the invention, link aggregation provides an interface that allows any parallel link 140 to be moved from one aggregated link 310 to another. The nodes 120 on each side of the parallel link 140 merely move the link into a new aggregated link 310 in the topology database.

In another embodiment of the invention, link aggregation can provide a service known as "local span restoration" to a network topology. In a non-aggregated network topology, when a particular connection between two intermediate nodes fails, the entire connection from the originating node to the destination node will fail. In this situation, the originating node must calculate a new route in order to reroute and set up a new connection across the network, as discussed above. However, using link aggregation, a link failure within the aggregate does not affect the aggregated link as a whole. The other links in the aggregate are available to support the connection and can compensate for the failed link. The connection may simply be moved from the failed line to another working line within the same aggregated link. Because the aggregated link is represented as a single link in the network topology, the route does not need to change and the local span between the nodes is restored automatically. This provides much faster restoration times and tolerance for failed lines in the network topology.

In one embodiment of the invention, to configure within a network 110 a plurality of lines into one or more aggregated links, a user can rely upon an SNC client module 307, which is connected to the network 110. This SNC client module 397 retrieves information (e.g., nodal information, behavioral network characteristics, SNC information, etc.) from the network and provides the user with the ability to configure these nodes to create the aggregated links. In particular, the user can create aggregated links by transmitting originating node, destination node, status information and service class information to the network. Based upon the configuration information that the user provides, the specific lines between the nodes identified by the user are configured into the aggregated link configuration requested by the user. In an alternative embodiment, this configuration of lines into aggregated links can be pre-configured or automated.

Functional Overview

Figure 4A:
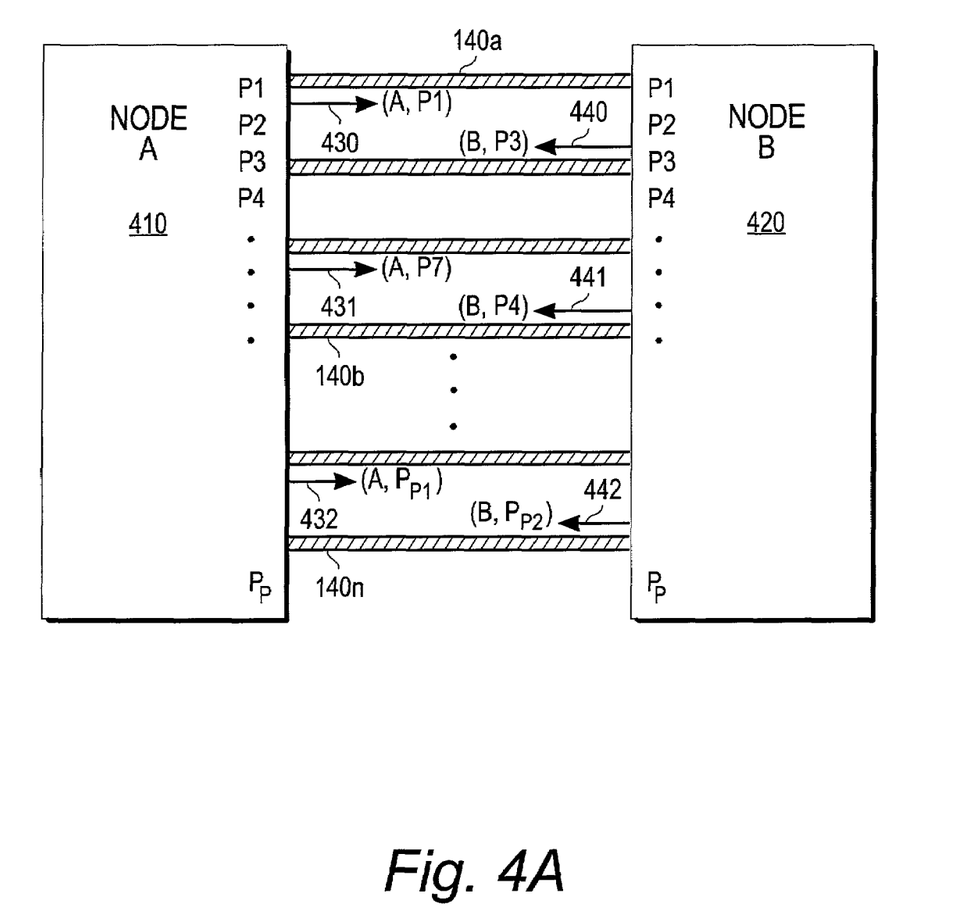
FIGS. 4A-4C illustrate how links are aggregated in another embodiment of the present invention.
Figure 4B:
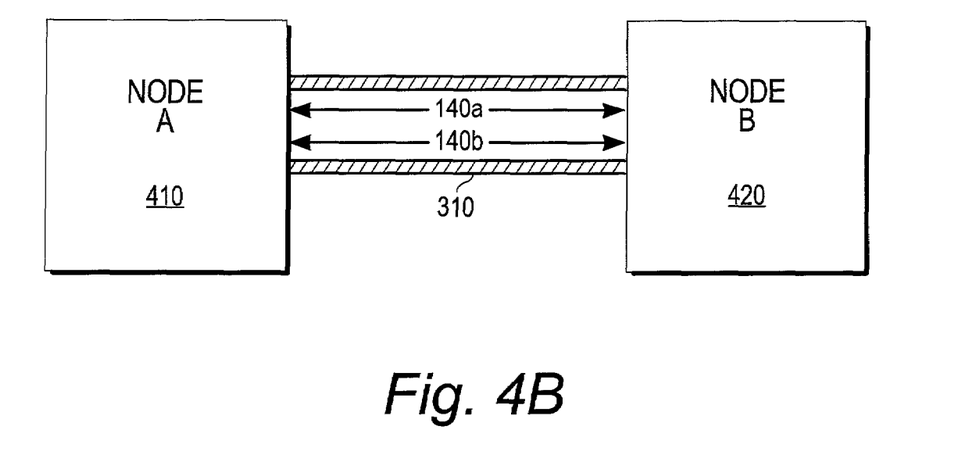
Figure 4C:
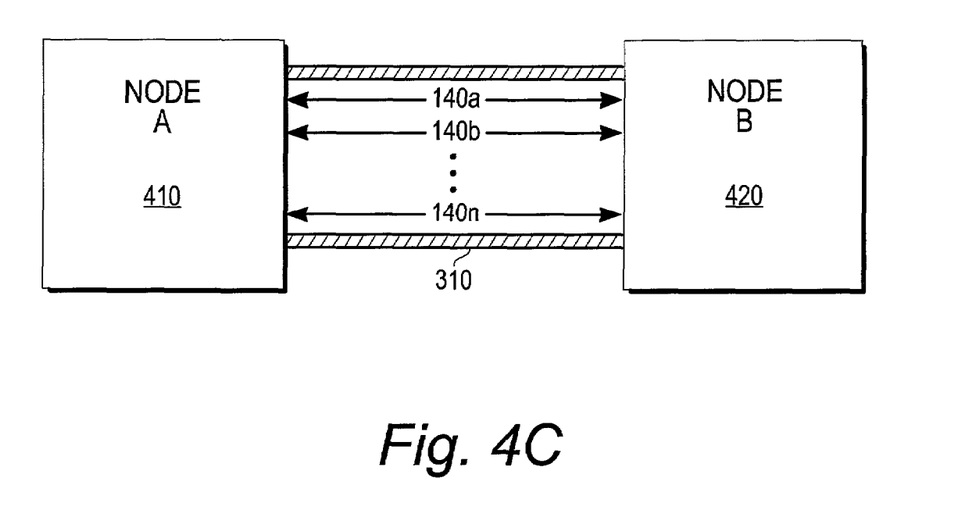

FIGS. 4A-4C exemplify how the signaling and routing protocol 210 enables link aggregation in another embodiment of the invention. For purposes of illustration, aggregation of parallel links 140 from node A to node B of FIG. 1B will be shown; however, parallel links 140 between any two nodes of network 110 may be aggregated in the same way.

FIGS. 4A-4C illustrate how links between two nodes 120 are aggregated in another embodiment of the present invention. As seen in FIG. 4A, a first node 410 at site A is connected to a second node 420 at site B. In one embodiment, each node 120 on network 110 comprises an SNC switch, such as the MultiWave CoreDirector™ switch, manufactured and distributed by CIENA Corporation. Nodes 410 and 420 each have p input/output ports, designated by $P_1$ through $P_p$. These ports communicate from one node to another by way of n parallel links 140, designated as 140a through 140n.

First node 410 (node A) sends a first transmit signal 430 to second node 420 (node B) across a first parallel link 140a. In one embodiment, the first transmit signal 430 is a "hello packet", containing information as to the origin (location and port) of the first transmit signal 430. For example, if the first transmit signal 430 was sent by port 1 of node A, the first transmit signal 430 would contain the message "I am node A, port 1". The first transmit signal 430 is received by second node 420.

Upon receiving the first transmit signal 430, second node 420 sends back a first return signal 440 to first node 410 verifying that the first transmit signal 430 was received. Thus, for example, if the first transmit signal 430 was received by port 3 of node B, the first return signal 440 would contain the message "I am node B, port 3". Upon receipt of the first return signal 440 by the first node 410, a common connection between node A and node B across parallel link 140a is identified.

First node 410 then sends a second transmit signal 431 across a second parallel link 140b. The second transmit signal 431 contains information as to the origin (location and port) of the second transmit signal 431. Thus, for example, if the second transmit signal 431 was sent by port 7 of node A, the second transmit signal 431 would contain the message "I am node A, port 7". The second transmit signal 431 is received by second node 420.

Upon receiving the second transmit signal 431, second node 420 sends back a second return signal 441 to first node 410 verifying that the second transmit signal 431 was received. Thus, as the example in FIG. 4A shows, the second return signal 441 could contain the message "I am node B, port 4". Upon receipt of the second return signal 441 by the first node 410, a second common connection between node A and node B across parallel link 140b is identified.

First node 410 and second node 420 are now aware that two separate but common parallel links (140a and 140b) exist between them. Thus, as seen in FIG. 4B, the signaling and routing protocol 210 (FIG. 2) can aggregate the two parallel links 140a and 140b by treating them as a single aggregated link 310. In doing so, the topology of nodes A and B of network 110 will appear as a single link to all nodes 120 in the network 110, even though the aggregated link 310 in actuality comprises the two physical connections of parallel links 140a and 140b.

Once aggregated link 310 is established, other parallel links 140 may be added to the aggregated link. Referring back to FIG. 4A, first node 410 sends an nth transmit signal 432 across parallel link 140n. As before, the nth transmit signal 432 contains information as to the origin (location and port) of the nth transmit signal 432, for example, the message "I am node A, port $p_1$". The nth transmit signal 432 is received by second node 420. Upon receiving the nth transmit signal 432, second node 420 sends back an nth return signal 442 to first node 410 verifying that the nth transmit signal 432 was received. For example, the nth return signal 442 could contain the message "I am node B, port $p_2$". Upon receipt of the nth return signal 442 by first node 410, a common connection between node A and node B across parallel link 140n is identified. As shown in FIG. 4C, the signaling and routing protocol 210 may now aggregate the nth additional link into the single aggregated link 310 formed as described above. Thus, the connection between nodes A and B of network 110 will still appear as a single link in the network topology, even though the aggregated link 310 in actuality now comprises multiple parallel links 140.

The process of aggregation just described is repeated until all parallel links 140 that are desired to be aggregated between nodes A and B are aggregated into single aggregated link 310. The process is likewise carried out by every node 120 to any other node 120 in network 110 containing at least two parallel links 140 that are common to each. A relatively complex network topology of multiple parallel links 140 is thus reduced to a series of single aggregated links 310, creating a simpler network topology to be used by the signaling and routing protocol 210.

Figure 5:
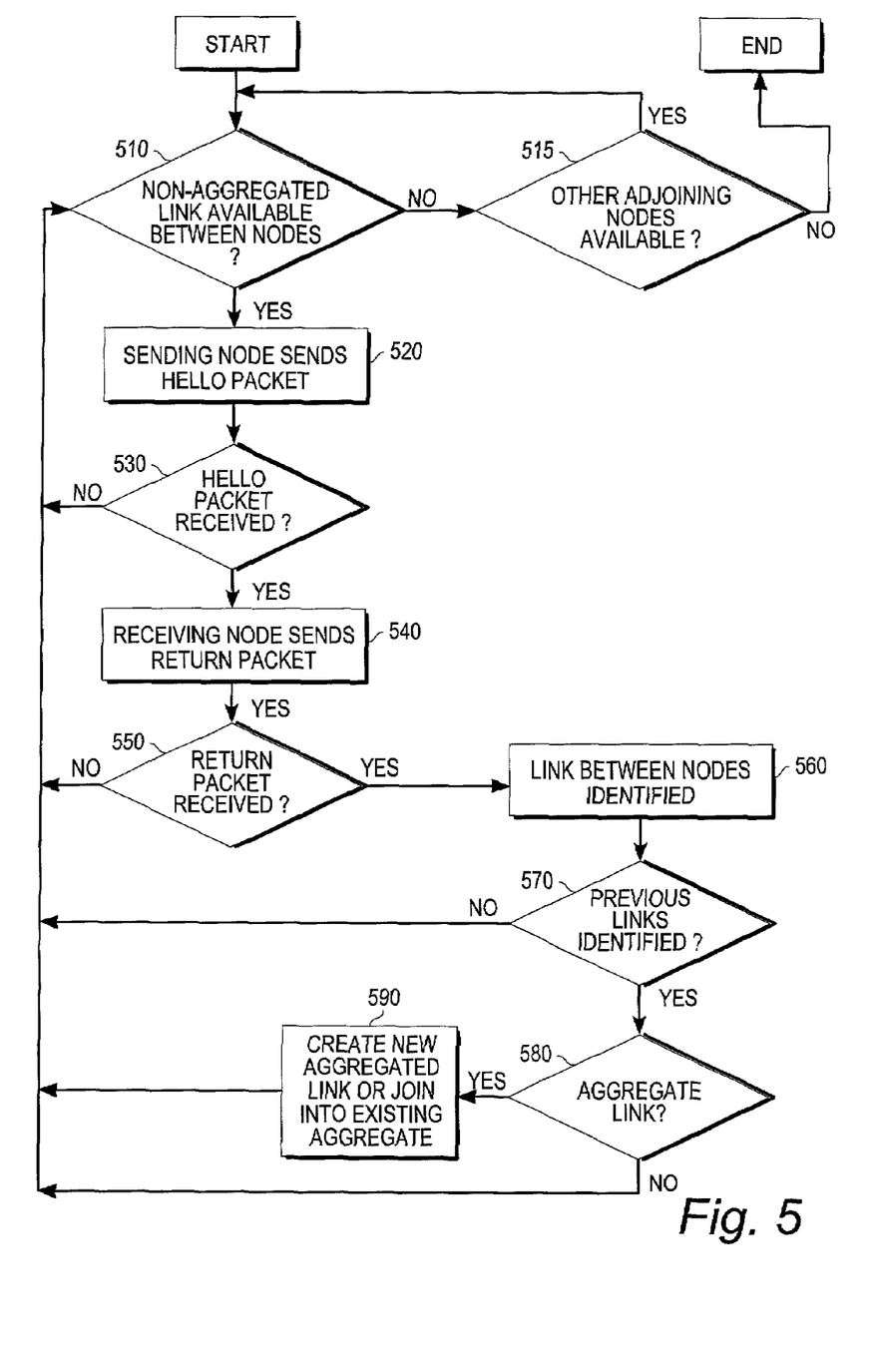
FIG. 5 is a flowchart describing how links are aggregated in another embodiment of the present invention.

FIG. 5 is a flowchart describing how multiple parallel links 140 are aggregated between first node 410 and second node 420 of FIG. 4A in another embodiment of the invention. The process begins at step 510, where first node 410 first determines whether a non-aggregated parallel link 140 exists between it and second node 420. If not, then no physical parallel links 140 are available to aggregate between first node 410 and second node 420. In that case, first node 410 determines in step 515 whether another adjoining node is available for aggregation. If not, then the process ends. However, if another node 120 is available to aggregate parallel links 140, then the process starts again at step 510 with the new node designated as second node 420.

If a non-aggregated parallel link 140 is available, first node 410 sends a hello packet across the available parallel link 140 at step 520. As described above, a hello packet contains information as to the origin (location and port) of the node from which the hello packet was sent. For example, the hello packet might contain the message "I am node A, port 1".

At step 530, second node 420 determines whether the hello packet successfully arrived. If the second node 420 does not successfully receive the hello packet, then the process begins again at step 510, where first node 410 looks for another non-aggregated parallel link 140. However, if second node 420 successfully receives the hello packet, then at step 540 second node sends back a return packet to first node 410 verifying that the hello packet was received, along with information as to its location and port. Thus, for example, if the hello packet is successfully received by port 3 of node B, the return packet will contain the message "I am node B, port 3".

At step 550, first node 410 checks whether the return packet has been successfully received. If not, the process returns to step 510 where first node 410 looks for another non-aggregated parallel link 140. However, if first node 410 successfully receives the return packet, then at step 560 a common parallel link 140 between first node 410 and second node 420 is identified.

At step 570, first node 410 checks to see if any other parallel links 140 have been previously identified between it and second node 420. If not, the parallel link 140 identified in step 560 cannot be aggregated at this time since no other compatible links have been identified for aggregation. In that case, the process returns to step 510 where first node 410 looks for another non-aggregated parallel link 140.

If the parallel link 140 identified in step 560 is not the only identified link between the nodes, then at step 580 the signaling and routing protocol 210 queries whether the parallel link 140 just identified should be aggregated with the rest of the identified links. In step 580, the decision to aggregate can be based on various criteria. For example, aggregation of parallel links 140 into any aggregated link 310 may be automatically determined based on a series of conditions or criteria specified by the signaling and routing protocol 210, such as class of service. Also, as discussed above, parallel links 140 between nodes may be aggregated into multiple aggregated links 310. In that case, step 580 determines which aggregated link 310 the parallel link 140 just identified should aggregate into, if any.

If at step 580 the parallel link 140 identified in step 560 is not to be aggregated, then the process returns to step 510 where first node 410 looks for another non-aggregated parallel link 140. However, if the parallel link 140 identified in step 560 is to be aggregated, then it can either form a new aggregated link 310 by joining with at least one other previously identified link or it can join an existing aggregated link 310. When the parallel link 140 is aggregated, its location and port information is joined with the location and port information of other links in the aggregate. The process then returns to step 510 where first node 410 looks for another non-aggregated parallel link 140.

As discussed above with reference to FIG. 1, each node 120 in network 110 advertises the status and availability of the parallel links 140 that connect it to adjacent nodes in the network. When advertising bandwidth to the network using link aggregation, the originating node will advertise the maximum available bandwidth for each aggregated link 310 connected to it. Because aggregated link 310 comprises multiple parallel links 140, it is desirable to advertise the largest available bandwidth of any of the parallel links 140 in the aggregation.

Figure 6A:
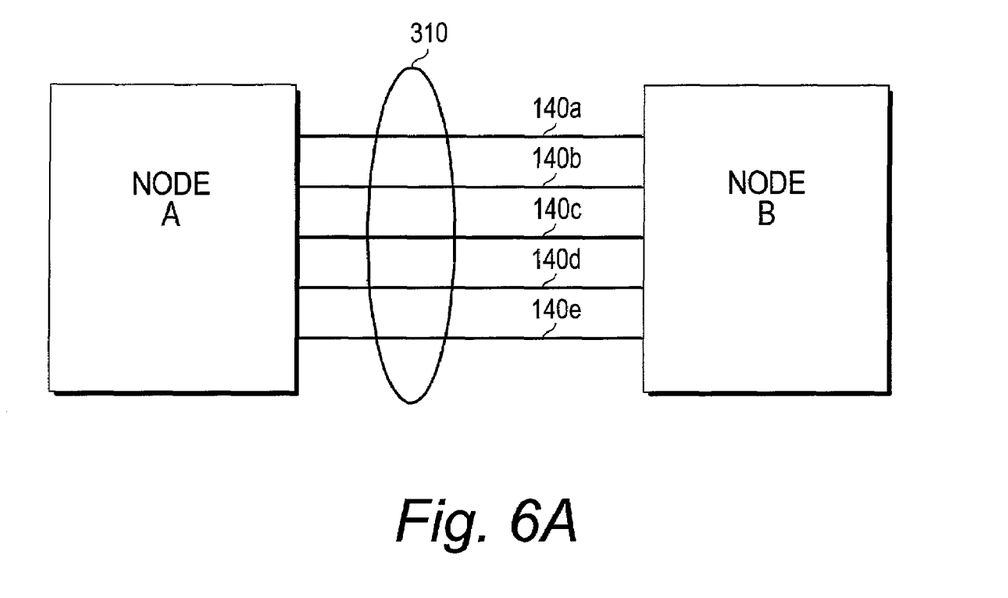
FIGS. 6A and 6B depict an example of how a signaling and routing protocol advertises the maximum available bandwidth of an aggregated link in another embodiment of the present invention.
Figure 6B:
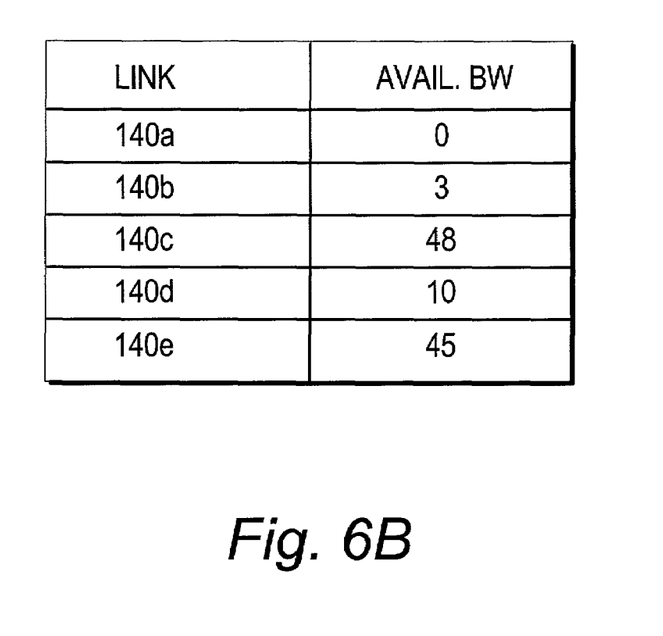

FIGS. 6A and 6B depict an example of how the signaling and routing protocol 210 advertises the maximum available bandwidth of aggregated link 310 to the network in another embodiment of the invention. As shown in the example in FIG. 6A, node A is connected to node B by five parallel links, 140a through 140e. All five parallel links 140a-e are aggregated into single aggregated link 310. In this example, assume that nodes A and B operate in a SONET network and that parallel links 140a-e carry 48 timeslots. Assume also that parallel link 140a has failed, link 140b is using 45 timeslots, link 140c is using no timeslots, link 140d is using 38 timeslots and link 140e is using 3 timeslots. In this example, node A assesses the available bandwidth of each parallel link 140 in the aggregate, shown in the table of FIG. 6B. Node A would thus advertise to the network an available bandwidth of 48 timeslots for aggregated link 310, the maximum number of timeslots taken from parallel link 140c. Node A would advertise this bandwidth even though parallel link 140a is down and parallel links 140b, 140d and 140e only have partial bandwidth available.

In another embodiment of the invention, the maximum available bandwidth advertised for aggregated link 310 is done using a "greedy algorithm". The greedy algorithm optimizes the bandwidth of aggregated link 310 by forcing each parallel link 140 in the aggregation to operate at its maximum capacity.

Figure 7A:
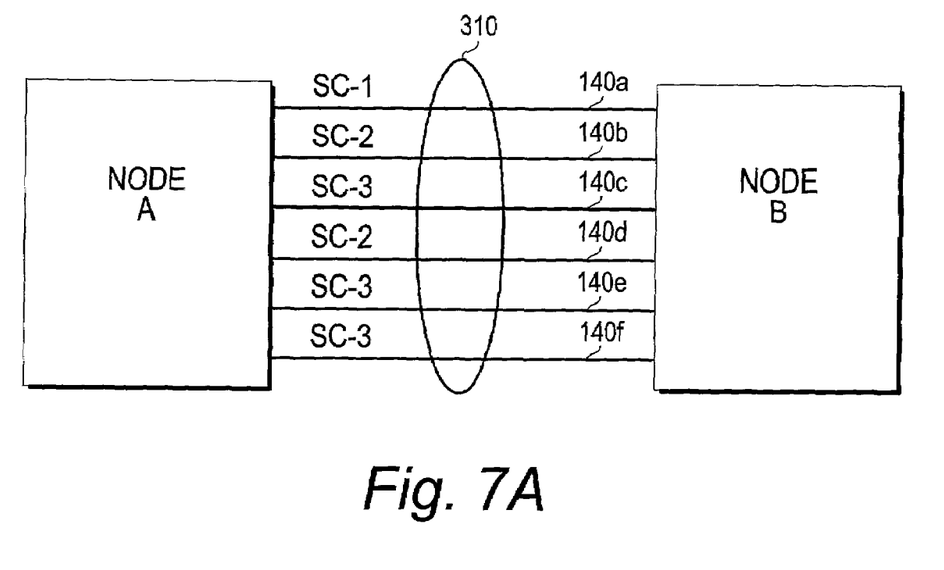
FIGS. 7A and 7B depict an example of how a greedy algorithm maximizes advertised bandwidth in another embodiment of the present invention.

FIGS. 7A and 7B depict an example of how the greedy algorithm maximizes advertised bandwidth of multiple service classes in another embodiment of the present invention. As shown in the example in FIG. 7A, node A is connected to node B by six parallel links, 140a through 140f. All six parallel links 140a-f are aggregated into aggregated link 310. In this example, assume that nodes A and B operate in a SONET network and that parallel links 140a-f each carry 48 timeslots. Assume also that parallel link 140a supports a first service class, SC-1, parallel links 140b and 140d each support a second service class SC-2, and parallel links 140c, 140e and 140f each support a third service class SC-3.

Figure 7B:
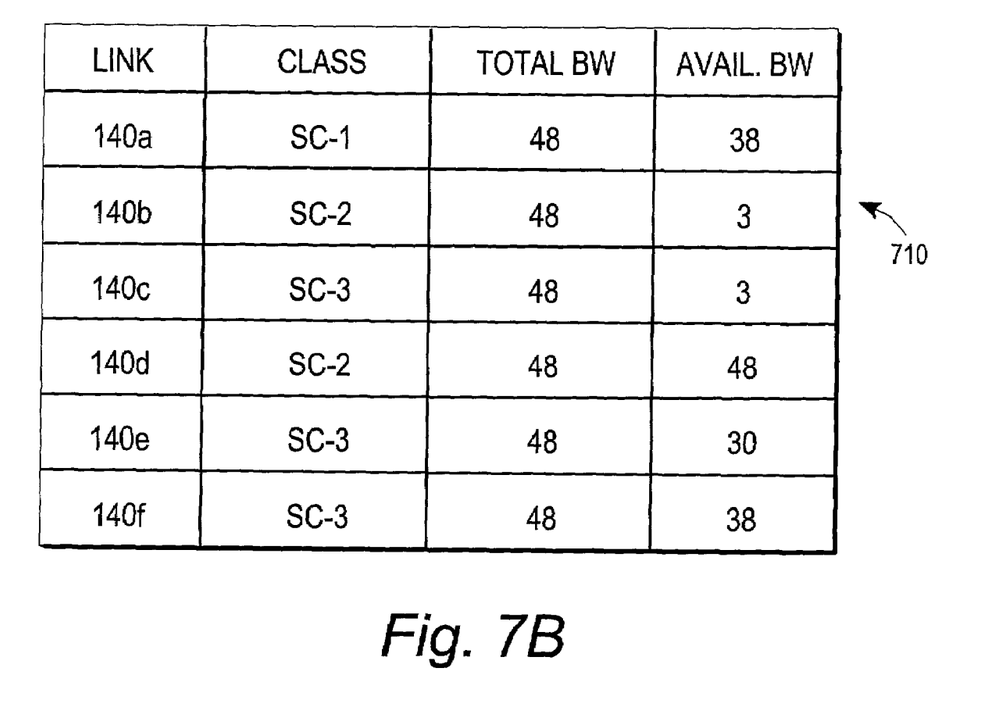

First, the greedy algorithm creates a table 710, shown in FIG. 7B. Table 710 includes, but is not limited to, a column for link, class of service, total bandwidth and available bandwidth. In order to optimize the advertised bandwidth for a particular class of service, the greedy algorithm chooses the parallel link 140 with the lowest available bandwidth sufficient to handle the request.

Thus, using the example in FIGS. 7A and 7B, node A could fulfill a request for 10 SC-1 timeslots on parallel link 140a and still advertise 38 timeslots as available for SC-1 services.

Likewise, node A could fulfill a request for 45 SC-2 timeslots on parallel link 140b, yet could still advertise 48 timeslots as available for SC-2 services from parallel link 140d. A subsequent request for 3 SC-2 timeslots could be fulfilled by either parallel link 140b or 140d. In this example, however, the greedy algorithm would choose parallel link 140b (with 3 timeslots available) over parallel link 140d (with 48 timeslots available). Choosing parallel link 140b to handle this request will allow node A to continue to advertise 48 available timeslots for SC-2 services, while choosing parallel link 140d would cause node A to advertise only 45 available timeslots.

Finally, assume that for SC-3 services, parallel link 140c has 3 timeslots available, parallel link 140e has 30 timeslots available and parallel link 140f has 38 timeslots available, as shown in FIG. 7B. In a subsequent request for 25 SC-3 timeslots, the greedy algorithm would choose parallel link 140e to handle the request, since it has the lowest available bandwidth sufficient to handle the request. Parallel link 140c has insufficient bandwidth for the request, and choosing parallel link 140f would cause node A to advertise only 30 available timeslots (from parallel link 140e). By choosing parallel link 140e to handle the request, node A can continue to advertise 38 available timeslots for SC-3 services. The greedy algorithm thus optimizes the available bandwidth of the aggregated link 310 by forcing each parallel link 140 in the aggregate to operate at its maximum capacity.

Whenever parallel links 140 are added to or dropped from the aggregated link 310, the columns of table 710 are merely updated accordingly and the new values are advertised to the network. The greedy algorithm and table 710 thereby provide a real-time method to advertise available bandwidth to the network and make bandwidth available to support various classes of service.

As shown in the preceding discussions, link aggregation greatly reduces the size of the topology database that is created at each node in the network and reduces the number and size of topology information that must be exchanged between nodes. Also, it reduces the number of links over which topology information must be exchanged. Because an aggregated link is a single link from the perspective of the signaling and routing protocol, the network topology does not change whenever a parallel link is added to the aggregate or fails. Therefore there is no need to flood the network with new topology information.

In terms of scalability, it is desirable to allow a network to grow while at the same time keeping the total number of links as low as possible. Without link aggregation, the performance limits of a network can be reached with relatively few nodes. By aggregating links together using the present invention, however, hundreds of nodes can be added to the network without surpassing the performance limits of the network.

In terms of maintenance, network administrators often monitor and observe the status of network links, particularly when generating routes. For example, the Java Element Manager displays a list of links known on the network. But a list with many hundreds of links would be difficult to use. Thus, network maintenance is simplified when fewer links are represented in the network topology.

System Overview

In one embodiment of the invention, nodes 120 of FIG. 1 comprise network switches. Each network switch comprises a plurality of switching mechanisms and each switching mechanism comprises a plurality of ports, with each port being coupled to a corresponding trunk, such as optical fiber. The switching mechanisms can couple any port to any other port of the network switch. It should be noted, however, that the present invention is not limited to being practiced within a switch, but rather may be implemented generally in any system in which inter-module distributed communication is desired.

In another embodiment of the invention, each network switch comprises a processor that enables the network switch to implement its own set of logic and functionality, including the signaling and routing protocol and other various aspects of the present invention. In one embodiment, the functionality of each network switch is derived by having the processor execute one or more sets of program instructions stored in a storage of that network switch. In such an embodiment, the processor (which may be a single processor or multiple processors) may be any mechanism capable of executing program instructions. The storage may be any type of computer readable medium capable of storing information, including but not limited to memory, magnetic storage and optical storage. The storage may be used to store program instructions, data used by the processor in executing the program instructions, data generated by the processor, as well as any other type of information.

In an alternative embodiment, the processor may be replaced by specialized hardware logic components specially configured to implement some desired functionality, including the signaling and routing protocol and other various aspects of the present invention. In such an embodiment, the functionality of each network switch would be derived not by having the processor execute program instructions but rather from the customized logic of the hardware logic components. This and other embodiments are within the scope of the present invention.

In yet another embodiment of the invention, a network device, such as a client computer, can control nodes 120 of FIG. 1. The network device comprises a processor that enables the device to implement its own set of logic and functionality, including the signaling and routing protocol and other various aspects of the present invention. The functionality of each network device is derived by having the processor execute one or more sets of program instructions stored in a storage of the device or by specialized hardware logic components configured to implement the desired functionality. In such an embodiment, the processor (which may be a single processor or multiple processors) may be any mechanism capable of executing program instructions. The storage may be any type of computer readable medium capable of storing information, including but not limited to memory, magnetic storage and optical storage. The storage may be used to store program instructions, data used by the processor in executing the program instructions, data generated by the processor, as well as any other type of information.

In the foregoing description, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for aggregating a plurality of physical lines connecting adjacent nodes within a network comprising a plurality of nodes, the method comprising:

determining line status information for at least two of said plurality of physical lines connecting adjacent first and second nodes, where said line status information includes information regarding available data transmission bandwidth for transferring data between said adjacent first and said second nodes;

associating at least a first and second of said plurality of physical lines connecting said first and second nodes with one another to create a first aggregated link, wherein said first and second of said plurality of physical lines are associated without affecting traffic;

determining aggregate status information for said first aggregated link;

broadcasting aggregate status information for said first aggregated link to at least one adjacent node and one non-adjacent node, where said first aggregated link includes the maximum data transmission bandwidth available over a one of said plurality of physical lines within said first aggregated link; and if one of said at least said first and second of said plurality of physical lines fails, performing local span restoration within said first aggregated link;

wherein the network comprises an optical network; and wherein the method is implemented as one of part of a signaling and routing protocol for the optical network, a sub-network connection client module communicating with the optical network, and combinations thereof.

2. The method of claim 1 further including the step of using a greedy algorithm to assign traffic across said first aggregated link.

3. The method of claim 1 wherein said first aggregate link consists solely of physical lines directly connecting the first node to the second node.

4. The method of claim 3 wherein said first aggregate link consists solely of physical lines directly connecting the first node to the second node, and wherein there are no intermediate nodes between the first node and the second node.

5. The method of claim 1, further comprising the step of associating at least a third of said plurality of physical lines connecting the first node to the second node with a second aggregated link containing line status information on said third physical line.

6. The method of claim 5, wherein said physical lines only include physical lines directly between the first node and the second node and there are no intermediate nodes between the first node and the second node.

7. The method of claim 5, wherein said second aggregate link consists of physical lines having a different class of service than said physical lines in said first aggregate link.

8. The method of claim 1, further comprising the steps:

determining the class of service for said plurality of physical lines connecting the first node to the second node by said status information;

prior to associating physical lines for said first aggregated link, selecting said first and second of said plurality of physical lines to be associated with each other in said first aggregate link from a group of said plurality of physical lines having a first class of service; and creating a second aggregate link to include at least a third of said plurality of physical lines connecting the first node to the second node having a second class of service different from the first class of service.

9. The method of claim 1 wherein the first node is a sub network connection network element.

10. The method of claim 9 wherein the sub network connection network element is a sub network connection switch.

11. The method of claim 1 comprising the additional step of transmitting the aggregate status information of the first aggregated link to said second node.

12. The method of claim 1 wherein said aggregate status information of said first aggregated link includes a class of service based upon the line status information of each of said plurality of physical lines associated with said first aggregated link.

13. The method of claim 1 further comprising the step of automatically associating at least two of said plurality of said physical lines with the first aggregated link.

14. The method of claim 1 further comprising the step of reassociating one of said plurality of physical lines from the first aggregated link to a second aggregated link without affecting traffic on said one of said plurality of physical lines.

15. The method of claim 1 further comprising the step of designating which of said plurality of physical lines associated with said first aggregated link transmits data to said second node.

16. The method of claim 1 wherein at least one of said plurality of physical lines includes optical fiber.

17. A method for directing information across a plurality of physical lines and switches in a network, the method comprising:
   storing line status information from said plurality of physical lines connecting a first switch to a second switch adjacent said first switch, the line status information including at least currently available bandwidth across each of said plurality of physical lines;
   grouping at least two of said plurality of physical lines connecting the first switch and the second switch into a first aggregated link without affecting traffic on said at least two of said plurality of physical lines;
   storing aggregate status information about the first aggregated link including the currently available bandwidth for a one of said plurality of physical lines within said first aggregated link having the highest currently available bandwidth selected from the line status information for said plurality of physical lines, where said aggregate status information is accessible by remote switches;
   receiving a request to send information from said first switch to said second switch, said request including the amount of required bandwidth for the information;
   directing the information across said first aggregated link only if said stored aggregate status information includes a currently available bandwidth greater than the required bandwidth for the information; and
   if one of said at least two of said plurality of physical lines fails, performing local span restoration within said first aggregated link;
   wherein the network comprises an optical network; and
   wherein the method is implemented as one of part of a signaling and routing protocol for the optical network, a sub-network connection client module communicating with the optical network, and combinations thereof.

18. The method of claim 17, further comprising:
   selecting a physical line from said plurality of physical lines within the first aggregated link by determining a group of physical lines having a currently available bandwidth at least as great as the required bandwidth for the information and selecting an optimal physical line from said determined group having the least currently available bandwidth; and
   directing the information across said optimal physical line.

19. The method of claim 17, further comprising:
   grouping at least a further two of said plurality of physical lines connecting the first switch and the second switch into a second aggregated link without affecting traffic on said at least said further two of said plurality of physical lines;
   storing second aggregate status information about the second aggregated link including the currently available bandwidth for a one of said plurality of physical lines within said second aggregated link having the highest currently available bandwidth selected from the line status information for said plurality of physical lines; and
   assigning the plurality of physical lines to the first aggregated link or the second aggregated link by placing physical lines having a first class of service in the first aggregated link and placing physical lines having a second class of service in the second aggregated link, wherein said assigning the plurality of physical lines to the first aggregated link or the second aggregated link is performed without affecting traffic.

20. The method of claim 19, further comprising:
   receiving a class of service request within the request to send information between said first switch and said second switch; and
   selecting an optimal aggregated link from said first aggregated link and said second aggregated link by selecting an aggregate link that matches the class of service request in said request to send information.

21. The method of claim 20, further comprising:
   selecting a physical line from said plurality of physical lines within the optimal aggregated link by determining a group of physical lines having a currently available bandwidth at least as great as the required bandwidth for the information and selecting an optimal physical line from said determined group having the least currently available bandwidth; and
   directing the information across said optimal physical line.

22. A method for directing information across a plurality of physical lines and switches in a network, the method comprising:
   grouping at least two of said plurality of physical lines connecting a first switch and a second switch adjacent said first switch into a first aggregated link without affecting traffic of said at least two of said plurality of physical lines;
   storing aggregate status information accessible by a third switch from said plurality of physical lines connecting a first switch to a second switch, the aggregate status information including at least currently available bandwidth across each of said plurality of physical lines;
   receiving a request to send information from said first switch to said second switch, said request including the amount of required bandwidth for the information; and
   directing the information across said first aggregated link only if said stored aggregate status information includes a currently available bandwidth greater than the required bandwidth for the information; and
   if one of said at least two of said plurality of physical lines fails, performing local span restoration within said first aggregated link;
   wherein the network comprises an optical network; and
   wherein the method is implemented as one of part of a signaling and routing protocol for the optical network, a sub-network connection client module communicating with the optical network, and combinations thereof.

23. The method of claim 22, further comprising:
   selecting a physical line from said plurality of physical lines within the first aggregated link by determining a group of physical lines having a currently available bandwidth at least as great as the required bandwidth for the information and selecting an optimal physical line from said determined group having the least currently available bandwidth; and directing the information across said optimal physical line.

24. The method of claim 22, further comprising:

grouping at least a further two of said plurality of physical lines connecting the first switch and the second switch into a second aggregated link without affecting traffic on said at least said further two of said plurality of physical lines;

storing second aggregate status information about the second aggregated link including the currently available bandwidth for a one of said plurality of physical lines within said second aggregated link having the highest currently available bandwidth selected from the line status information for said plurality of physical lines;

assigning the plurality of physical lines to the first aggregated link or the second aggregated link by placing physical lines having a first class of service in the first aggregated link and placing physical lines having a second class of service in the second aggregated link.

25. The method of claim 22, further comprising:

receiving a class of service request within the request to send information between said first switch and said second switch; and selecting an optimal aggregated link from said first aggregated link and said second aggregated link by selecting an aggregate link that matches the class of service request in said request to send information.

26. The method of claim 22 wherein said first aggregate link consists solely of physical lines directly connecting the first node to the second node.

27. The method of claim 22 wherein said first aggregate link consists solely of physical lines directly connecting the first node to the second node, and wherein there are no intermediate nodes between the first node and the second node.

28. A method for directing information across a plurality of physical lines and switches in a network, the method comprising:

grouping at least two of said plurality of physical lines connecting a first of said switches and a second of said switches into a first aggregated link without affecting traffic on said at least two of said plurality of physical lines;

storing aggregate status information from said plurality of physical lines connecting a first switch to a second switch, the aggregate status information including at least currently available bandwidth across each of said plurality of physical lines and the class of service for each of said plurality of physical lines;

receiving a request to send information from said first switch to said second switch, said request including the amount of required bandwidth for the information and the minimum class of service required; and directing the information across said first aggregated link only if said stored aggregate status information includes a currently available bandwidth greater than the required bandwidth for the information;

selecting a physical line from said plurality of physical lines within the first aggregated link by determining a group of physical lines having a currently available bandwidth at least as great as the required bandwidth for the request and having at least the minimum class of service required by the request;

selecting an optimal physical line from said determined group having the least currently available bandwidth;

directing the information across said optimal physical line; and if one of said at least two of said plurality of physical lines fails, performing local span restoration within said first aggregated link;

wherein the network comprises an optical network; and wherein the method is implemented as one of part of a signaling and routing protocol for the optical network, a sub-network connection client module communicating with the optical network, and combinations thereof.

* * * * *